United States Patent
Tholiya et al.

(10) Patent No.: US 9,679,065 B2
(45) Date of Patent: Jun. 13, 2017

(54) L-GRAM AND R-GRAM FREQUENCY-WEIGHTED QUERY RESPONSES

(71) Applicant: Wal-Mart Stores, Inc., Bentonville, AR (US)

(72) Inventors: Namrata PramodKumar Tholiya, Sunnyvale, CA (US); Abhishek Gattani, Sunnyvale, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 288 days.

(21) Appl. No.: 14/448,898

(22) Filed: Jul. 31, 2014

(65) Prior Publication Data

US 2016/0034584 A1    Feb. 4, 2016

(51) Int. Cl.
*G06F 17/30*    (2006.01)
*G06F 7/00*    (2006.01)

(52) U.S. Cl.
CPC .. *G06F 17/30867* (2013.01); *G06F 17/30663* (2013.01)

(58) Field of Classification Search
CPC ................ G06F 17/30867; G06F 17/30663
USPC ........................................... 707/710
See application file for complete search history.

(56) References Cited

U.S. PATENT DOCUMENTS

| | | | | |
|---|---|---|---|---|
| 5,544,049 A * | 8/1996 | Henderson | ........ | G06F 17/30011 704/7 |
| 5,826,260 A * | 10/1998 | Byrd, Jr. | ........... | G06F 17/30687 707/999.005 |
| 5,920,854 A * | 7/1999 | Kirsch | ............. | G06F 17/30616 707/999.001 |
| 5,963,940 A * | 10/1999 | Liddy | ............... | G06F 17/30654 707/E17.068 |
| 6,006,225 A * | 12/1999 | Bowman | ........... | G06F 17/30395 707/999.004 |
| 6,772,150 B1 * | 8/2004 | Whitman | .......... | G06F 17/30448 707/721 |
| 8,326,861 B1 * | 12/2012 | Ainslie | ............. | G06F 17/30663 707/766 |
| 8,515,985 B1 * | 8/2013 | Zhou | ................. | G06F 17/30646 707/767 |
| 2007/0112764 A1 * | 5/2007 | Yih | ........................ | G06F 17/241 707/999.005 |
| 2007/0288450 A1 * | 12/2007 | Datta | ................... | G06F 17/2217 707/999.005 |

(Continued)

*Primary Examiner* — Pavan Mamillapalli
(74) *Attorney, Agent, or Firm* — Bryan Cave LLP

(57) ABSTRACT

Queries are analyzed to identify start-side sub-queries that include a starting word of the query and one or more contiguous words and end-side sub-queries that include an ending word of the query and one or more contiguous words. A start-side count is determined for a sub-query indicating a number of times it occurs among the queries as a start-side query. An end-side count is also computed for each sub-query indicating the number of times it occurs as an end-side sub-query. A score is computed for each sub-query that decreases with the start-side count and increases with the end-side count. A search is performed for a received query with some of the phrases (e.g. noun phrases) thereof weighted according to the scores. Noun phrases may be identified as the longest n-gram for which an entry in a reference dictionary exists.

18 Claims, 4 Drawing Sheets

(56) References Cited

U.S. PATENT DOCUMENTS

| | | | |
|---|---|---|---|
| 2008/0319975 A1* | 12/2008 | Morris | G06F 3/048 |
| | | | 707/999.005 |
| 2009/0006324 A1* | 1/2009 | Morris | G06F 17/30864 |
| | | | 707/999.003 |
| 2010/0094673 A1* | 4/2010 | Lobo | G06Q 30/02 |
| | | | 705/14.69 |

* cited by examiner

L-GRAM AND R-GRAM FREQUENCY-WEIGHTED QUERY RESPONSES

BACKGROUND

Field of the Invention

This invention relates to systems and methods for providing relevant search results.

Background of the Invention

The objective of a search engine is to provide the most relevant results to a user. Many algorithms have been devices to achieve this goal. In particular, prior responses to search results and the queries that were used to identify the search results are used in some prior approaches to determine a relevant result. For example, such metrics as click-through-rate and others may be used to determine user response to search results.

The systems and methods disclosed herein provide an improved approach for providing search results in response to a query.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
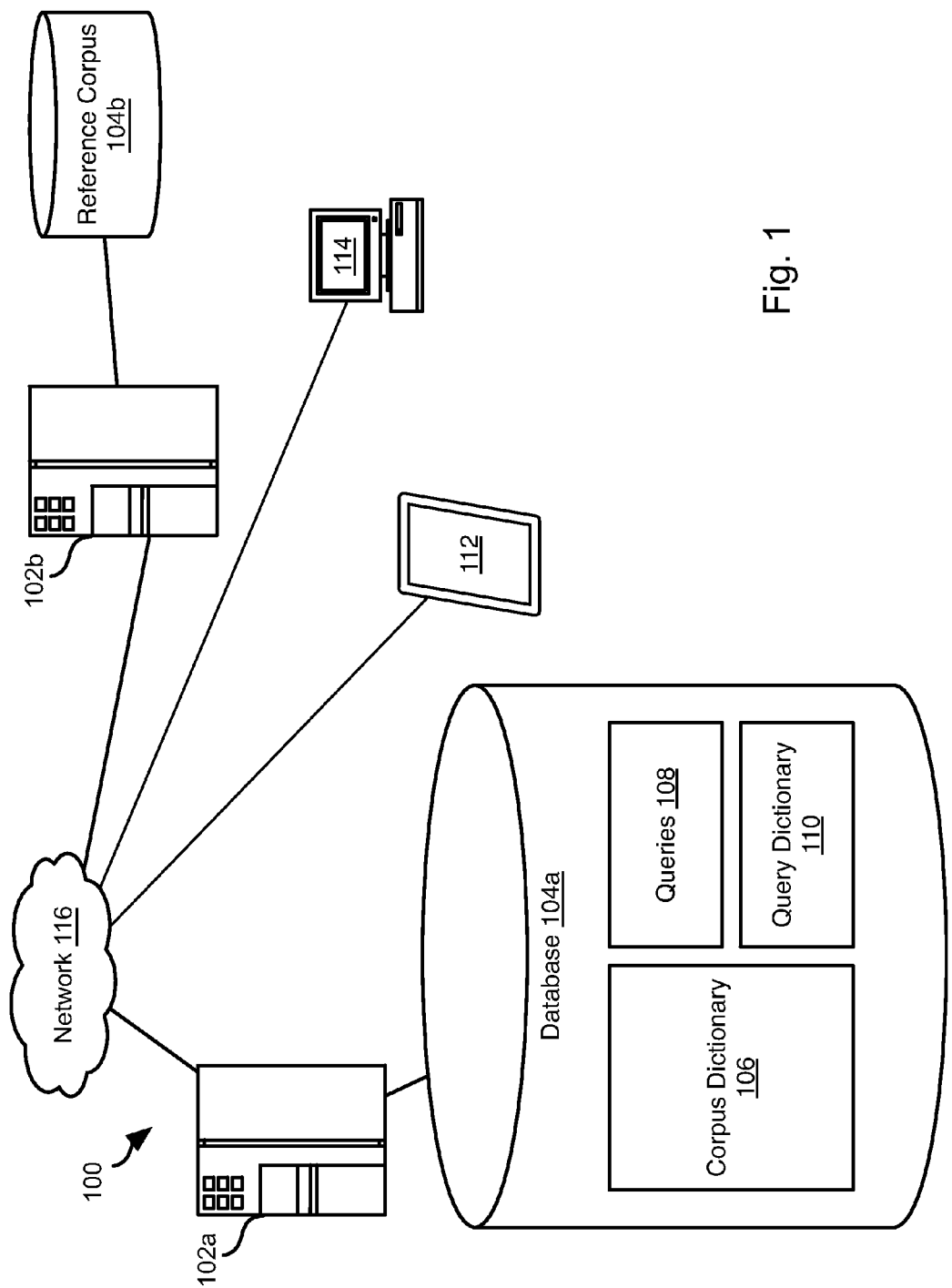
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the methods disclosed herein may be implemented using the illustrated network environment 100. For example, a server system 102*a* may response to queries from users. The server system 102*a* may operate exclusively as a search engine or may also function as an ecommerce webserver and point of sale and searches may be searches of product records received within an ecommerce website.

The server system 102 may host or access a database 104*a* to facilitate responding to queries. The database 104*a* may store a corpus dictionary 106. The corpus dictionary may be a list of terms obtained from a reference corpus such as a dictionary including words and definitions or an encyclopedia including articles on various subjects. For example, the corpus dictionary 106 may be obtained from analysis of a reference corpus 104*b* that is accessible online, such as through one or more other servers 102*b*. The corpus dictionary 106 may be a list of terms taken from the titles of articles available in the reference corpus or otherwise obtained from the content of the reference corpus.

The database 104*a* may additionally store queries 108. Queries 108 may be queries received by the server 102*a* or queries included in referrals from a search engine hosted by another system. For example, a third-party search engine may present a link to a web interface hosted by the server system 102*a* in response to a query received by the third-party search engine. Upon a user selecting the link, the third-party search engine may transmit a request for the web interface along with the query the resulted in the presentation of the link. Queries 108 may be stored indefinitely or may store only those queries received in the last N days, weeks, months, or years, where N is a value greater than zero.

The database 104*a* may further store a query dictionary 110 generated based on the queries 108. Methods by which the query dictionary 110 is generated and used are described in greater detail below.

The server system 102*a* may receive queries from mobile devices 112 (smart phones, tablet computers, wearable computers, etc.) and from desktop or laptop computers 114. The mobile devices 112 and computers 114 may communicate with the server system 102*a* by means of a network 116 such as the Internet, a local area network (LAN), wide area network (WAN), or some other network connection. The mobile devices and computers 114 may communicate with the server system 102*a* by means of any wired or wireless protocol.

Figure 2:
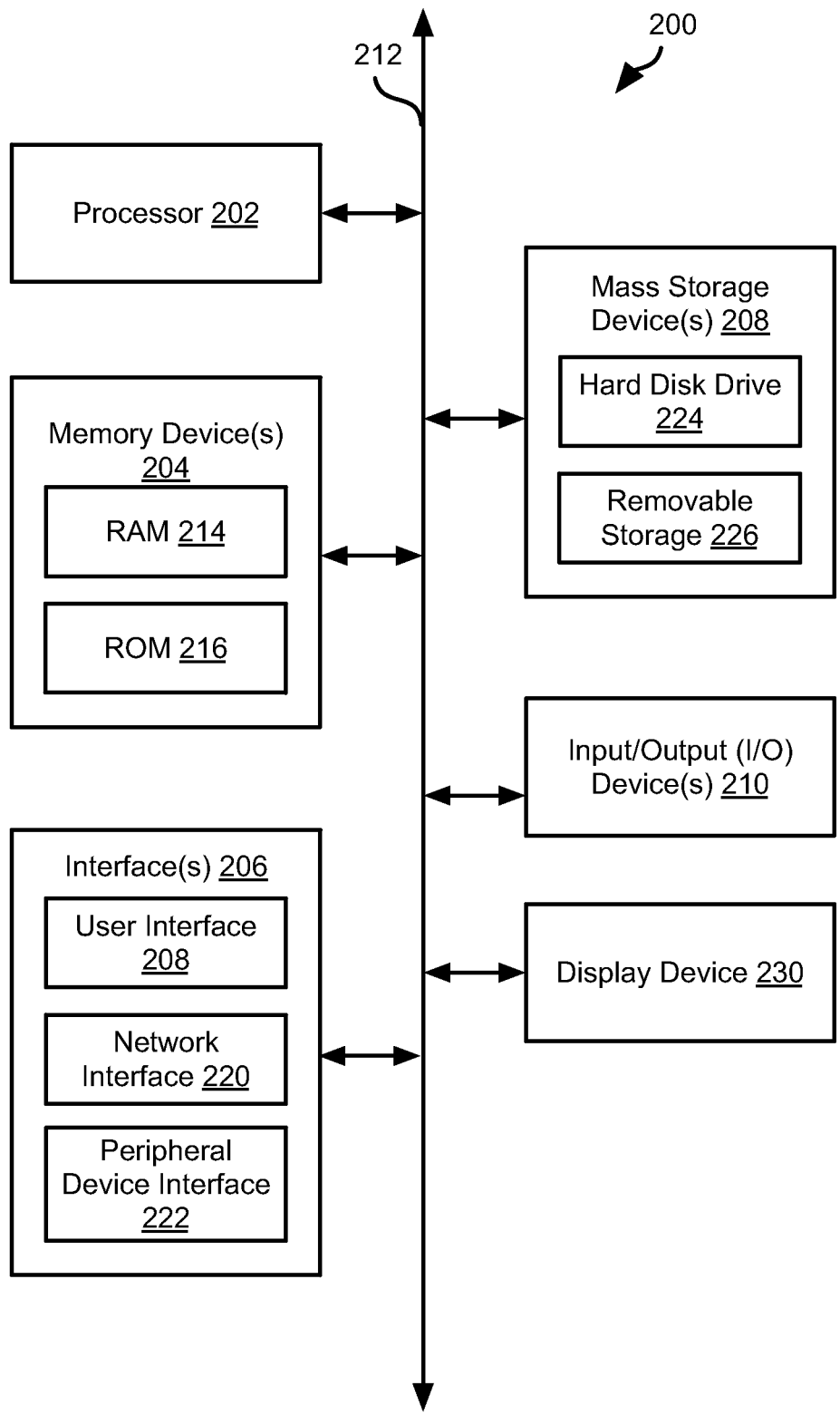
FIG. 2 is schematic block diagram of a computer system suitable for implementing methods in accordance with embodiments of the invention.

FIG. 2 is a block diagram illustrating an example computing device 200. Computing device 200 may be used to perform various procedures, such as those discussed herein. A server system 102*a*, 102*b*, mobile device 112, and computer 114 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like. A server system 102*a*, 102*b* may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
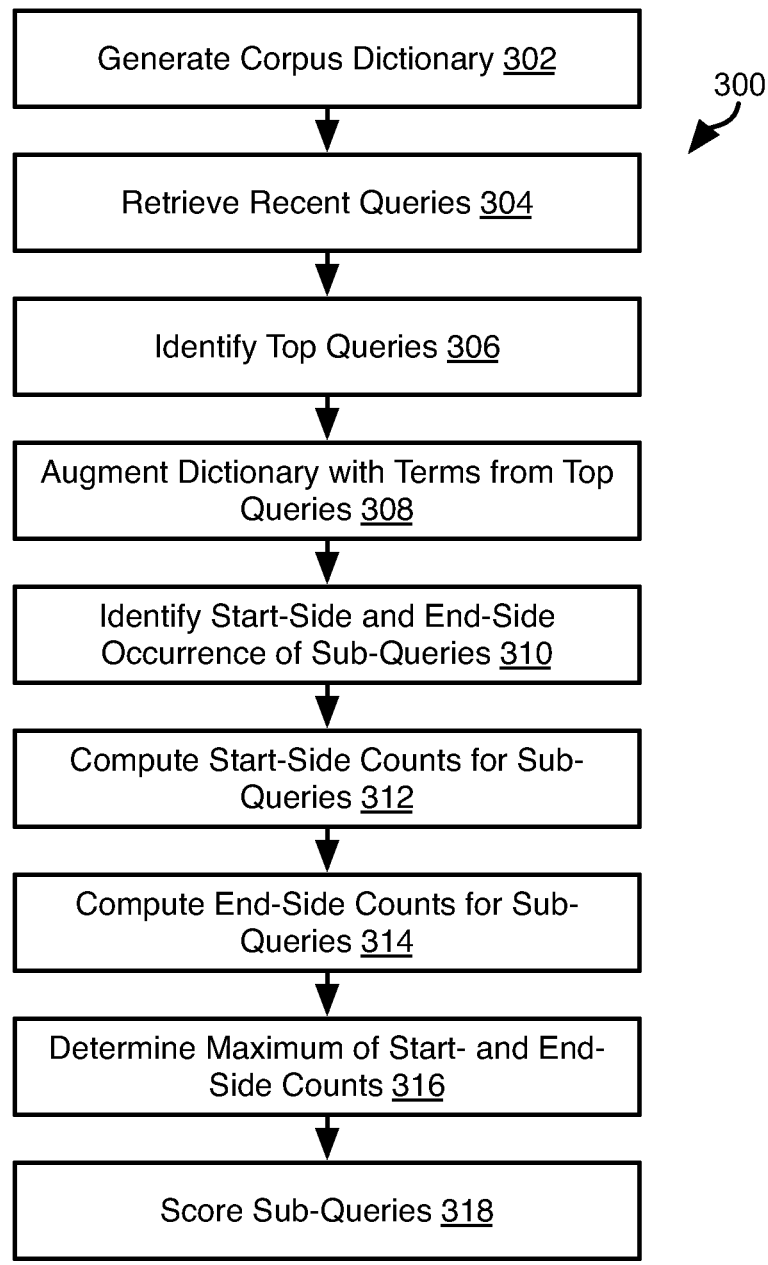
FIG. 3 is a process flow diagram of a method for scoring queries in accordance with an embodiment of the present invention.
Figure 4:
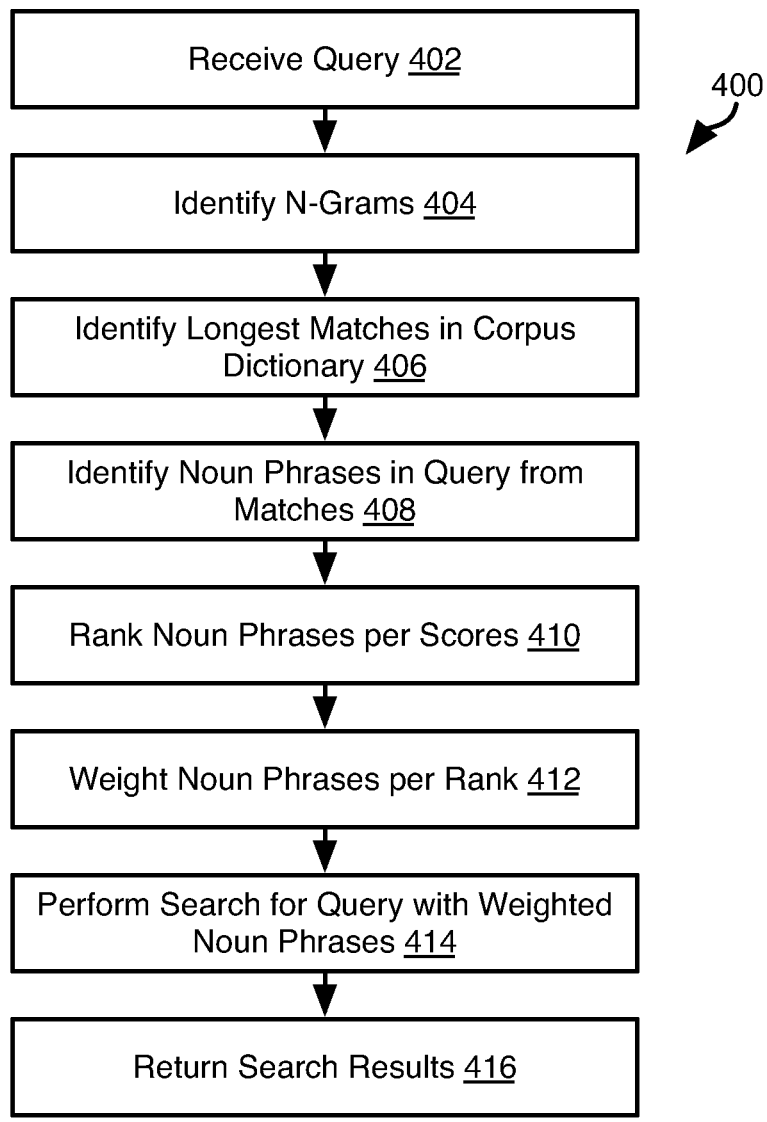
FIG. 4 is a process flow diagram of a method for responding to a query in accordance with an embodiment of the present invention.

Referring to FIG. 3, the illustrated method 300 may be used to generate a corpus dictionary 106 and query dictionary 110 for use in responding to queries, such as according to the method 400 of FIG. 4. The method 300 may be executed periodically, e.g. every N days, weeks, or months in order to maintain the dictionaries 106, 110 current. The method 300 may be executed by the server system 102*a* or some other computer system.

The method 300 may include generating 302 the corpus dictionary 106 by analyzing the reference corpus 104*b*. For example, the titles of some or all articles in the corpus dictionary may be retrieved and included as entries in the corpus dictionary 106. Other criteria may also be used to select strings of one or more words from among the titles of articles of the corpus and/or the content of the articles themselves.

The method 300 may further include retrieving 304 recent queries, such as queries from the last M days, weeks, or months. For example, queries from the month preceding the time of performing step 304 are used. The top queries from among the recent queries may be identified and the corpus dictionary may then be augmented 308 with terms from top queries identified from among the top queries. For example, the top P queries having the highest number of occurrences among the recent queries may be identified. Each query may include one or more strings of one or more words. These strings of one or more words may then be added to the corpus dictionary. In particular, those strings of one or more words found in the top queries may be added to the corpus dictionary if not already present in the dictionary. Steps 302-308 may be performed independently and with different frequency from the following steps 310-318.

At step 310 start-side and end-side occurrence of sub-queries may be identified 310 among the recent queries. In particular, a start-side sub query of a query may be a sub-query of that is a series of one or more contiguous words from the sub-query that include the starting word of the query. Likewise, an end-side sub query may be a series of one or more contiguous words from the query that include end ending word of the query. For purposes of this disclosure, a word may be any series of characters including alphanumeric characters. Words may also be identified from the query by means of whitespace characters separating them, commas, or other delimiting characters. The method by which the query is parsed to identify words may include any method known in the art.

In some languages, text is read from left to right, accordingly each start-side sub-query may include the left-most word of a query (i.e. and l-gram) and each end-side sub query may include the right-most word of the query (i.e. and r-gram). If the query is received in a language that is read from right to left, the starting and ending words may be identified oppositely.

The method 300 may further include computing 312 a start-side count and computing 314 an end-side count. Specifically, the number of occurrences of each start-side sub-query may be computed as the start-side count of that sub-query. Likewise, the number of occurrences of each end-side sub-query may be the number of occurrences of the end-side sub-query.

The method 300 may further include determining 316 a maximum of all the start- and end-side counts. Specifically, among the set of values including all of the start- and -end-side counts, the largest value may be identified. The largest value may be referred to hereinafter as "mcount." For each sub-query, a score may be calculated 318. For example, the score may be calculated as:

$$\sqrt{\frac{end\_count}{mcount}} * \left(1 - \sqrt{\frac{start\_count}{mcount}}\right),$$

where "end_count" is the end-side count of the sub-query occurs and "start_count" is the start-side count of the sub-query. That is to say, a sub-query may occur as a start-side sub-query or an end-side query. Accordingly, the score for a sub-query may be based on both the end-side and start-side counts of the sub-query. As is readily apparent, the score increases with increasing end count for the sub-query and decreases with increasing start count of the sub-query. Other functions that achieve this correspondence may also be used. For example, the square root operations may be replaced with some other function or exponent. In addition, rather than including a term of the form $1-\sqrt{start\_count/mcount}$, this term may be replaced with a term of the form $$\left(1 - \frac{start_{count}}{mcount}\right)^x,$$

where x is ½ or some other integer or fractional value.

The score as calculated above may advantageously enable the distinguishing of sub-queries located at the beginning of a query to the sub-queries at the end of the query. In particular, words that occur at the end of a query phrased grammatically may be more likely to indicate a user's intent. For example, given the query "24 inch Sony TV," "TV" is the operative term and all results should include it prominently. In contrast, the leading term "24" and "inch" are more general.

Referring to FIG. 4, the illustrated method 400 may be used to respond to queries using the scores as calculated according to the method 300. The method 400 may be executed by the server system 102*a* or some other computer system.

The method 400 may include receiving 402 a query, such as from a mobile device 112 or computing device 114. The query may be parsed to identify 404 one or n-grams. An n-gram may be any series of one or more characters. An n-gram may include one or more words or other characters separated by whitespace, commas, or some other delimiter. An "n-gram" as used herein may include an n-gram as this term is known in the art.

The method 400 may further include for the n-grams, identifying 406 the longest matches in the corpus dictionary for one or more of the n-grams. In particular, for a particular series of characters in the query, the longest n-gram of the plurality of n-grams that includes that series of characters that has a matching entry in the corpus dictionary may be selected to represent that series of characters in subsequent steps of the method 400. For example, given a query including "16 GB iPhone 4s," possible n-grams may include "16," "16 GB," "iPhone," "iPhone 4S," and "16 GB iPhone 4s," among others. Since the 16 GB iPhone 4s exists, an entry for it may exist in the corpus dictionary. Accordingly, the n-gram "16 GB iPhone 4s" may be selected to represent the characters of this string since it is the longest n-gram for which an entry exists.

The n-grams identified at step 406 may then be evaluated to identify 408 those identified n-grams that are noun phrases. In particular, the query itself and the context in which the identified n-grams occur may be evaluated to identify those n-grams that are used as nouns or noun phrases in the query. In particular, natural language processing (NLP) and part of speech (POS) identification techniques known in the art may be used to identify those n-grams that are used as nouns in the query.

The noun phrases identified at step 408 may then be ranked according to scores associated with the noun phrases. In particular, a noun phrase may have occurred as a sub-query in the queries analyzed according to the method 300 and may therefore have a corresponding score. If a noun-phrase has not occurred as a start-side or end-side query in the queries analyzed, the score for that noun-phrase may be zero.

Accordingly, the noun phrases may be ranked 410 from highest score to lowest. The noun phrases may then be weighted according to their rank, with higher ranked noun-phrases being weighted more than noun-phrases with lesser rank. For example, the range of possible scores (zero to one) may be divided up into R sub-ranges or bins r1, r2, r3 . . . rR. Each noun phrase may then be assigned to the range within which its score falls. Of the possible ranges, some or all of them may have a noun-phrase assigned thereto. Accordingly, each range having at least one noun-phrase assigned thereto may be assigned a rank according to the value of the range. The highest range with an assigned noun phrase is ranked highest, the next highest range with an assigned noun-phrase is ranked second, and so on until the lowest range having an assigned noun phrase is ranked last. Each noun phrase within a range may then be assigned 412 a weight according to the rank of that range. The highest ranked range is given a higher weight than the second highest ranked range, the second highest ranked range is given a higher weight than the third highest ranked range, and so on.

For example, where P(i) is the rank assigned to range i, all noun phrases assigned to range i may receive a weight according to some function W(P(i)). W(P) may be a linear range that decreases linearly from a highest weight W(1) assigned to the noun phrases of the highest ranked range. Alternatively W(P) may decrease exponentially or according to some polynomial or other function that decreases with increasing rank number (i.e. $2^{nd}$ place, $3^{rd}$ place $4^{th}$ place, etc.).

The method 400 may further include performing 414 a search using the query with the identified noun phrases weighted according to the weights assigned at steps 412. In some embodiments, performing a weighted search may include returning only results that include the highest weighted noun phrase and omitting others from the returned results. The results of the search may be returned to the user or computer system from which the query was received at step 402.

Various search engine algorithms known in the art perform terms or phrases to be assigned weights and which identify and rank search results according to the inclusion and usage of the terms and the weights assigned thereto. For example, the APACHE SOLR search of the APACHE LUENCE project. Accordingly, performing 414 a weighted search and returning 416 results may be performed using such an algorithm. The documents searched at step 414 may be web pages, a corpus of product records, or some other collection of documents.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A computer-implemented method of providing relevant search results comprising:
    receiving a plurality of past computer search queries;
    identifying among the plurality of past computer search queries a plurality of sub-queries each including one or more contiguous words from a past query of the plurality of past computer search queries, the plurality of sub-queries including a start sub-query including a starting word of the past query of the plurality of past computer search queries and an end sub-query including an ending word of the past query of the plurality of past computer search queries;
    for each sub-query of the plurality of sub-queries:
        generating a start sub-query count that is equal to a number of occurrences of the sub query as the start sub-query;
        generating an end sub-query count that is equal to a number of occurrences of the sub query as the end sub-query;
        generating a sub-query score that:
            is a function of the start sub-query count and the end sub-query count;
            decreases with increasing start sub-query count; and
            increases with increasing end sub-query count;
    receiving, through a computer network, an n-gram query that includes a plurality of terms;
    for each of a plurality of first phrases that include contiguous terms of the plurality of terms, determining a phrase weight using the sub-query score of one of the plurality of sub-queries that corresponds to the each of the plurality of first phrases;
    submitting the n-gram query to a search engine with the phrase weight for each of the plurality of first phrases;
    receiving results from the search engine; and
    returning the results.

2. The method of claim 1, further comprising identifying the plurality of first phrases in the n-gram query by:
    identifying the plurality of first phrases as one or more contiguous terms in the n-gram query that are entries in a reference dictionary.

3. The method of claim 1, further comprising identifying the plurality of first phrases in the n-gram query by:
    identifying the plurality of first phrases as longest phrases in the n-gram query that are also found in a reference dictionary.

4. The method of claim 1, further comprising:
    identifying second phrases in the n-gram query that are also entries in a reference dictionary; and
    identifying as the plurality of first phrases a portion of the second phrases that are used as nouns in the n-gram query according using a natural language processing (NLP) and part of speech (POS) algorithm.

5. The method of claim 1, wherein determining the phrase weight for the plurality of first phrases using the sub-query score of the one of the plurality of sub-queries that corresponds to the each of the plurality of first phrases comprises:
    defining a plurality of bins each having a score range;
    assigning each first phrase of the plurality of first phrases to a bin of the plurality of bins according to the sub-query score of one of the plurality of sub-queries that corresponds to the first phrase of the plurality of first phrases; and weighting each first phrase of the plurality of first phrases that have been assigned to each bin of the plurality of bins according to a rank of the score range of the each bin of the plurality of bins relative to other bins of the plurality of bins having one or more of the first phrases of the plurality of first phrases assigned thereto.

6. The method of claim 1, wherein generating the sub-query score that is a function of the start sub-query count and the end sub-query count comprises generating the sub-query score that increases with increasing end sub-query count.

7. The method of claim 1, wherein generating the sub-query score that is a function of the start sub-query count and the end sub-query count comprises generating the sub-query score that decreases with increasing start sub-query count.

8. The method of claim 1, wherein generating the sub-query score that is a function of the start sub-query count and the end sub-query count comprises calculating the sub-query score as:

$$(\text{end\_count}/\text{mcount})^{1/2} * [1-(\text{start\_count}/\text{mcount})^{1/2}],$$

where mcount is a maximum value of the start sub-query count and the end-query count for the plurality of sub-queries, end_count is the end sub-query count, and start_count is the start sub-query count.

9. A system comprising one or more processors and one or more memory devices operably coupled to the one or more processors, the one or more memory devices storing executable and operational data effective to cause the one or more processors to:
receive a plurality of past computer network queries;
identify among the plurality of past computer network queries a plurality sub-queries each including one or more contiguous words from a past query of the plurality of past computer network queries, the plurality of sub-queries including start sub-queries including a starting word of the past query and end sub-queries including an ending word of the past query;
for each sub-query of the plurality of sub-queries:
generate a start sub-query count equal to a number of occurrences of the each sub query of the plurality of sub-queries as a start sub-query;
generate an end sub-query count equal to a number of occurrences of the each sub query of the plurality of sub-queries as an end sub-query;
generate a score that:
is a function of the start sub-query count and the end sub-query count;
decreases with increasing start sub-query count; and
increases with increasing end sub-query count;
receive an ecommerce query including a plurality of terms;
for a plurality of first phrases including contiguous terms of the plurality of terms, determine weights for the plurality of first phrases according to scores of a sub-query of the plurality of sub-queries corresponding to the plurality of first phrases;
submit the ecommerce query to a search engine with the weights for the plurality of first phrases;
receive results from the search engine; and
return the results.

10. The system of claim 9, wherein the executable and operational data are further effective to cause the one or more processors to identify the plurality of first phrases in the ecommerce query by:
identifying the plurality of first phrases as one or more contiguous terms in the ecommerce query that are entries in a reference dictionary.

11. The system of claim 9, wherein the executable and operational data are further effective to cause the one or more processors to identify the plurality of first phrases in the ecommerce query by:
identifying the plurality of first phrases as longest phrases in the ecommerce query that are also found in a reference dictionary.

12. The system of claim 9 wherein the executable and operational data are further effective to cause the one or more processors to:
identify second phrases in the ecommerce query that are also entries in a reference dictionary; and
identify as the plurality of first phrases a portion of the second phrases that are used as nouns in the ecommerce query using a natural language processing (NLP) and part of speech (POS) algorithm.

13. The system of claim 9, wherein the executable and operational data are further effective to cause the one or more processors to determine the weights for the plurality of first phrases according to the scores of a sub-query of the plurality of sub-queries corresponding to the plurality of first phrases by:
defining a plurality of bins each having a score range;
assigning each first phrase of the plurality of first phrases to a bin of the plurality of bins according to the score of the sub-query of the plurality of sub-queries corresponding to the first phrase; and
weighting the first phrases assigned to each bin according to a rank of the score range of the each bin relative to other bins having first phrases assigned thereto.

14. The system of claim 9, wherein the executable and operational data are further effective to cause the one or more processors to generate the score that is a function of the start sub-query count and the end sub-query count by generating the score such that the score increases with increasing end sub-query count.

15. The system of claim 9, wherein the executable and operational data are further effective to cause the one or more processors to generate the score that is a function of the start sub-query count and the end sub-query count by generating the score such that that the score decreases with increasing start sub-query count.

16. The system of claim 9, wherein the executable and operational data are further effective to cause the one or more processors to generate the score that is a function of the start sub-query count and the end sub-query count by generating the score that decreases with increasing start sub-query count and increases with increasing end sub-query count.

17. The system of claim 9, wherein the executable and operational data are further effective to cause the one or more processors to generate the score that is a function of the start sub-query count and the end sub-query count by calculating the score as:

$$(\text{end\_count}/\text{mcount})^{1/2} * [1-(\text{start\_count}/\text{mcount})^{1/2}],$$

where mcount is a maximum value of the start sub-query counts and the end-query counts for the plurality of sub-queries, end_count is the end sub-query count, and start_count is the start sub-query count.

18. A computer-implemented method of providing relevant product record search results to users of an ecommerce website, the method comprising:
identifying start-side occurrences and end-side occurrences of sub-queries of past queries wherein the start-side occurrences include starting words from the past queries and end-side occurrences include ending words from the past queries;

computing a start-side count from the start-side occurrences;

computing an end-side count from the end-side occurrences;

determining a maximum count of the start-side count and the end-side count;

calculating a sub-query score for each of the sub-queries from the past queries using the start-side count, the end-side count, and the maximum count, wherein the sub-query score:

decreases with increasing start sub-query count; and increases with increasing end sub-query count; and using a computer system, selecting and providing to the users the relevant product record search results using at least one of multiple sub-query scores that include the sub-query score for each of the sub-queries from the past queries.

* * * * *